(12) United States Patent
Funaoka et al.

(10) Patent No.: US 7,809,033 B2
(45) Date of Patent: Oct. 5, 2010

(54) LASER OSCILLATOR

(75) Inventors: Koji Funaoka, Chiyoda-ku (JP);
Masahiko Hasegawa, Chiyoda-ku (JP);
Kazuo Sugihara, Chiyoda-ku (JP);
Yasunari Matsumoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 325 days.

(21) Appl. No.: 12/153,054

(22) Filed: May 13, 2008

(65) Prior Publication Data
US 2009/0180503 A1 Jul. 16, 2009

(30) Foreign Application Priority Data
Jan. 10, 2008 (JP) .............................. 2008-003348

(51) Int. Cl.
*H01S 3/04* (2006.01)
(52) U.S. Cl. .......................................... 372/35; 372/34
(58) Field of Classification Search .................. 372/36, 372/34, 35; 219/216; 361/707
See application file for complete search history.

(56) References Cited

U.S. PATENT DOCUMENTS

| | | | | |
|---|---|---|---|---|
| 5,416,791 | A * | 5/1995 | Otani et al. | 372/58 |
| 6,400,740 | B1 * | 6/2002 | Karpinski | 372/36 |
| 6,650,668 | B2 * | 11/2003 | Yatskar et al. | 372/36 |
| 6,792,017 | B2 * | 9/2004 | Halpin | 372/35 |

FOREIGN PATENT DOCUMENTS

| | | |
|---|---|---|
| DE | 10 2007 006 867 | 10/2007 |
| JP | 64-028878 A | 1/1989 |
| JP | 07-302942 | 11/1995 |
| JP | 8-257782 A | 10/1996 |
| JP | 09-061684 | 3/1997 |
| JP | 2684108 B2 | 8/1997 |
| JP | 2002-141270 A | 5/2002 |

OTHER PUBLICATIONS

Office Action issued in Corresponding German Application No. 10 2008 035 224.1-54 dated Sep. 9, 2009, and an English Translation thereof.

* cited by examiner

*Primary Examiner*—Minsun Harvey
*Assistant Examiner*—Tuan N. Nguyen
(74) *Attorney, Agent, or Firm*—Buchanan Ingersoll & Rooney PC

(57) ABSTRACT

A laser oscillator is obtained in which the flatness of an optical element that makes contact with a cooling flange is maintained in a highly precise state, by suppressing a flange presser and a base from profile-deforming the cooling flange. The flange presser and the cooling flange make contact with each other by the intermediary of three protrusions provided in either one of the flange presser and the cooling flange, and the three protrusions are arranged at the vertexes of a triangle; the cooling flange and the base make contact with each other by the intermediary of three protrusions provided in either one of the cooling flange and the base; the three points at which the flange presser and the cooling flange make contact with each other by the intermediary of the protrusions and the three points at which the cooling flange and the base make contact with each other by the intermediary of the protrusions are arranged in such a way as to face respective corresponding points; and the flange presser and the base that flank the cooling flange are fixed fastened with a fastening member.

6 Claims, 13 Drawing Sheets

B — B CROSS SECTION
(a)

A — A CROSS SECTION
(b)

LASER OSCILLATOR

BACKGROUND OF THE INVENTION

1. Field of the Invention

The present invention relates to a laser oscillator and particularly to a mounting structure for the optical element thereof.

2. Description of the Related Art

FIG. 14 is a structural cross-sectional view illustrating a laser oscillator, utilizing a conventional unstable resonator, disclosed in Japanese Patent Laid-Open No. 1991-257979. In FIG. 14, reference numerals 51 and 52 denote a totally reflecting mirror (curvature radius $R_1$=1 m) and a magnifying mirror (curvature radius $R_2$=2 m), respectively, each having a concave contour and being formed, for example, of Cu; the totally reflecting mirror 51 and the magnifying mirror 52 are arranged spaced apart from each other by a resonator length of 1.5 m in such a way as to be configured in a negative-branch and confocal manner (magnification rate=2). Reference numerals 53 and 54 denote respective mirror pressers on which the totally reflecting mirror 51 and the magnifying mirror 52 are mounted; reference numerals 55 and 56 denote respective mirror cooling plates that are formed of a flat plate and are in contact with the totally reflecting mirror 51 and the magnifying mirror 52 so as to cool them.

Reference numeral 57 denotes a scraper mirror formed, for example, of Cu; through the scraper mirror 57, a ring-shaped laser-beam output is obtained from the unstable resonator. Reference numeral 58 is a transmission mirror formed, for example, of ZnSe; a laser bean passes through the transmission mirror 58 and is emitted outward from the laser oscillator. Reference numeral 59 is a laser medium; for example, in the case of a gas laser such as a $CO_2$ laser, a gas medium excited through discharge or the like is utilized; in the case of a solid-state laser such as a YAG laser, a solid-state medium excited by a flash lamp or the like is utilized. Reference numeral 60 denotes an aperture for controlling the diameter of a laser beam; reference numeral 61 denotes a case for covering the unstable resonator; reference numeral 62 denotes a laser beam generated inside the unstable resonator configured with the totally reflecting mirror 51 and the magnifying mirror 52; reference numeral 63 denotes a ring-shaped laser beam emitted outward through the transmission mirror 58.

FIG. 15 is a cross-sectional view illustrating a mounting structure for the magnifying mirror 52 illustrated in FIG. 14. In FIG. 15, reference numerals 52a and 52b denote an opening diameter and a mirror diameter, respectively, of the magnifying mirror 52; the portions (52b-52a) correspond to thermal-contact portions. Reference numeral 64 denotes a bolt for fixing to the mirror cooling plate 56 the mirror presser 54 on which the magnifying mirror 52 is mounted. Reference numeral 65 denotes an O-shaped ring provided behind the magnifying mirror 52; by pressing the magnifying mirror 52 through the O-shaped ring 65, the magnifying mirror 52 is pressure-bonded to the mirror cooling plate 56, so that the thermal contact between the magnifying mirror 52 and the mirror cooling plate 56 is ensured. In addition, in FIG. 15, the mounting structure for the magnifying mirror 52 (optical element) is illustrated; however, the mounting structure for the totally reflecting mirror 51 (optical element) is the same as the foregoing structure.

Next, the operation will be explained. The laser beam 62 reciprocates between the totally reflecting mirror 51 and the magnifying mirror 52 and is amplified by the laser medium 59 while reciprocating. Part of the laser beam 62 that has been amplified in this manner is reflected by the scraper mirror 57 and emitted outward from the laser oscillator, through the transmission mirror 58. Because the unstable resonator is configured through a confocal arrangement, the emitted laser beam 63 becomes a parallel beam. In this case, the totally reflecting mirror 51 and the magnifying mirror 52 are slightly capable of absorbing laser light; therefore, while the laser beam 62 reciprocates within the unstable resonator, the heat is absorbed by the totally reflecting mirror 51 and the magnifying mirror 52. The heat is radiated from the respective contact surfaces in the surfaces of the mirror cooling plates 55 and 56 that are cooled with water, thereby preventing the mirror temperature from rising.

FIG. 16 is a principal-part cross-sectional view illustrating the mounting structure, for a mirror (optical element), disclosed in Japanese Patent Laid-Open No. 1996-257782. A mirror 82 is mounted in such a way that the reflection surface thereof abuts on a bend block 83. It is required that the foregoing mirror that is utilized in the laser oscillator should have a high flatness of not more than one-tenth of the wavelength of laser light to be oscillated. Ultrahigh-precision flat-surface machining intended for a flatness of not more than 1 μm is applied to a contact surface (flat portion for mounting the mirror) 85 between the bend block 83 and the mirror 82 so that a profile deformation of the mirror 82 due to pressing force is prevented.

In addition, reference numerals 81, 84, 86, 87 and 88, 89, and 90 denote laser light, a supporting base, a mounting screw, adjusting screws, a cooling water path, and a dust-proof member. Additionally, also in FIG. 14, it is a common practice that ultrahigh-precision flat-surface machining disclosed in Japanese Patent Laid-Open No. 1996-257782 is applied to the respective contact surfaces between the mirror cooling plates 55 and 56 and the corresponding mirrors so that profile deformations of the mirrors 55 and 56 are prevented.

FIG. 17 is an exploded perspective view illustrating a lens-holding structure in an optical device, having an exposure apparatus, disclosed in Japanese Patent Laid-Open No. 2002-141270. The foregoing lens-holding structure is configured in such a way that, by flanking a lens 97 with holding members (pressing rings) 91 and 92 each having three protrusions 95 that face the respective corresponding protrusions, the holding members (pressing rings) 91 and 92 are prevented from profile-deforming the lens 97. The foregoing lens-holding structure is configured in such a way that the deformations of holding members 91 and 92 do not cause the bending moment to be applied to the lens (optical element). In addition, reference numerals 96, and 93 and 94 denote a lens tube, and curved surfaces of the lens.

In the resonator illustrated in FIG. 14, the flatness of the contact surface between the mirror presser 53 and the mirror cooling plate 55 and the flatness of the contact surface between the mirror presser 54 and the mirror cooling plate 56 are low; therefore, it has been a problem that, when the mirror pressers 53 and 54 are pressed against the mirror cooling plates 55 and 56, respectively, and fixed fastened with bolts 64, the mirror pressers 53 and 54 profile-deform the mirror cooling plates 55 and 56, respectively, whereby the mirror cooling plates 55 and 56 profile-deform the mirrors 51 and 52, respectively. Because the flatness of the contact surface between the mirror cooling plate 55 and the case 61 and the flatness of the contact surface between the mirror cooling plate 56 and the case 61 are also low, a phenomenon similar to that described above takes place; thus, when the mirror cooling plates 55 and 56 are fixed to the case 61, the case 61 profile-deforms the mirror cooling plates 55 and 56, whereby the mirrors 51 and 52 are deformed.

In order to prevent the foregoing deformation, by applying ultrahigh-precision flat-surface machining to the sides, facing the case 61, of the mirror pressers 53 and 54 and the mirror cooling plates 55 and 56, the sides, facing the mirror pressers 53 and 54, of the mirror cooling plates 55 and 56, respectively, and the contact surface of the case 61, the profile-deformation can be prevented; however, there exists a problem that the ultrahigh-precision flat-surface machining is extremely expensive, as well as a problem that, due to the restriction on the machining apparatus, a large component such as the case 61 cannot be machined.

With regard to the mirror mounting structure illustrated in FIG. 16, it is required to apply ultrahigh-precision machining (with flatness of not more than 1 μm) to the bend block 83; however, there exists a problem that, due to the restriction on the ultrahigh-precision machining apparatus, a large component such as the bend block 83 cannot be machined. When the ultrahigh-precision machining cannot be applied to the bend block 83, the bend block 83 profile-deforms the mirror 82, whereby the flatness does not meet a tolerance.

In the optical-device holding structure illustrated in FIG. 17, because the lens 97 and each of the holding members 91 and 92 are in point contact with each other, the heat-transfer area is extremely small; therefore, the coolability of the lens 97 becomes insufficient. Additionally, in the case where the optical element is formed of a relatively soft material such as ZnSe, because the stress that is concentrated in the vicinity of the protrusion 95 recesses the optical element or partially changes the refraction index thereof, it is required that the optically effective region (e.g., the region through which a light beam passes) and the three point-contact protrusions be separated from each other; therefore, as a result, the diameter of the optical element becomes large, whereby the cost is considerably raised.

Moreover, in the case where an O-shaped ring is provided between the optical element and the holding member in order to keep the airtightness, there exists a problem that, because the optical element and each of the holding members are in point contact with each other, the reactive force, which is produced when the O-shaped rings are crushed, warps the portion, of the optical element, which is not in point contact with the holding members. It is devised that, in order to reduce the warp, the thickness of the optical element is enlarged so that the bending rigidity of the optical element is raised; however, because the optical element becomes extremely expensive, the cost is considerably hiked.

SUMMARY OF THE INVENTION

The present invention has been implemented in order to solve the foregoing problems; the objective of the present invention is to maintain in a highly precise state the flatness of an optical element that makes contact with a cooling flange, by suppressing a flange presser and a base from profile-deforming the cooling flange when the cooling flange on which the optical element abuts and that cools the optical element is flanked with the flange presser and the base so as to be fixed fastened.

In a laser oscillator according to the present invention, an optical element abuts on a cooling flange so that the optical element is cooled, and the cooling flange is flanked with a flange presser and a base so that the cooling flange is fixed; the laser oscillator is configured in such a way that the flange presser and the cooling flange make contact with each other by the intermediary of three protrusions provided in either one of the flange presser and the cooling flange, and the three protrusions are arranged at the vertexes of a triangle; the cooling flange and the base make contact with each other by the intermediary of three protrusions provided in either one of the cooling flange and the base; the three points at which the flange presser and the cooling flange make contact with each other and the three points at which the cooling flange and the base make contact with each other are arranged in such a way as to face respective corresponding points; and the flange presser and the base that flank the cooling flange are fixed fastened with a fastening member.

According to the laser oscillator according to the present invention, by, through a three-point contact structure, flanking with the flange presser and the base the cooling flange on which the optical element abuts and that cools the optical element so as to fix and fasten the cooling flange, the flange presser and the base are suppressed from profile-deforming the cooling flange when the cooling flange is fixed and fastened, whereby the flatness of the optical element that makes contact with the cooling flange can be maintained in a highly precise state. Moreover, by applying high-precision machining to the surface, of the cooling flange, on which the optical element abuts, the flatness of the optical element can be maintained in a highly precise state, whereby the laser oscillator is inexpensive.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
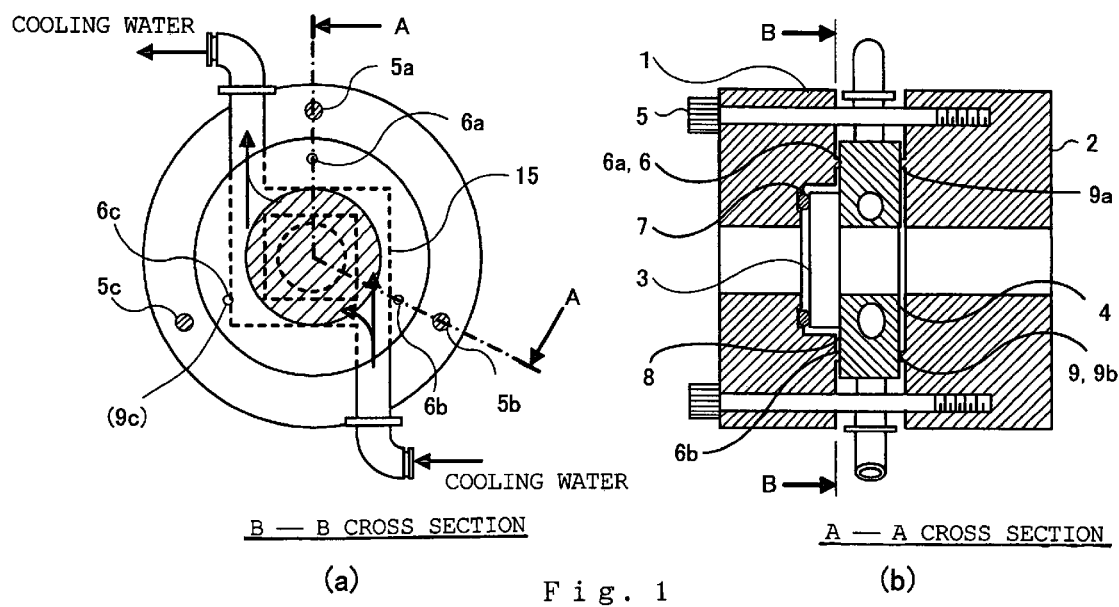
FIG. 1 is a set of cross-sectional views illustrating a mirror-mounting structure, for a laser oscillator, according to Embodiment 1 of the present invention.

FIG. 1 is a set of views illustrating a mirror-mounting structure, for a laser oscillator, according to Embodiment 1 of the present invention; FIG. 1(a) is a cross-sectional view of the mirror-mounting structure in FIG. 1(b), as viewed along B-B; FIG. 1(b) is a cross-sectional view of the mirror-mounting structure in FIG. 1(a), as viewed along A-A. A mirror 3 abuts on a surface 8 of a cooling flange 4; ultrahigh-precision machining intended for a flatness of not more than 1 μm is applied to the surface 8 of the cooling flange 4. Because the cooling flange 4 is a small component, ultrahigh-precision flat-surface machining can readily be applied to the cooling flange 4, without any restriction on the machining apparatus. Ultrahigh-precision flat-surface machining can be applied only to the most elevated surface of a component; however, because the machining surface 8 of the cooling flange 4 is the most elevated surface thereof, ultrahigh-precision flat-surface machining can be implemented. Reference numeral 7 denotes an O-shaped ring.

The cooling flange 4 is cooled by making water flow through a cooling-water path 15. In order to ensure the heat conductivity, an aluminum material is utilized for the cooling flange 4. Because the mirror 3 (e.g., a resonance mirror) and the cooling flange 4 are in contact with each other at the ultrahigh-precision flat surfaces thereof, the heat transfer is sufficient, whereby the mirror 3 is sufficiently cooled. The cooling flange 4 is flanked with the flange presser 1 and the base 2. In addition, the base 2 is the case of a laser oscillator or the like. Machining of three through-holes for bolts 5 is applied to the flange presser 1, and machining of three screw holes for the bolts 5 is applied to the base 2; by tightening three bolts 5a, 5b, and 5c, the cooling flange 4 is tightly flanked with the flange presser 1 and the base 2 so as to be fixed. As a result, the flange presser 1 pressure-bonds the mirror 3 (optical element) and the cooling flange 4 by the intermediary of the O-shaped rings 7, whereby the mirror 3 is sufficiently cooled.

Three protrusions 6 are provided at the side, of the flange presser 1, which makes contact with the cooling flange 4; that is to say, protrusions 6a, 6b, and 6c are provided. The protrusions 6 are in contact with the cooling flange 4. Similarly, three protrusions 9 are provided at the side, of the base 2, which makes contact with the cooling flange 4; that is to say, protrusions 9a, 9b, and 9c are provided. The base 2 is in contact with the cooling flange 4 through the protrusions 9. Three protrusions 6a, 6b, and 6c (protrusions 6) and three protrusions 9a, 9b, and 9c (protrusions 9) are arranged in a positional relationship in which the protrusions 6a, 6b, and 6c face the protrusions 9a, 9b, and 9c, respectively (in a relationship in which the protrusions 6a and 9a, the protrusions 6b and 9b, and the protrusions 6c and 9c are situated on the respective same straight lines that are parallel to the optical axis). The protrusions 6 situated between the flange presser 1 and the cooling flange 4 may be provided in the cooling flange 4. The protrusions 9 situated between the cooling flange 4 and the base 2 may be provided in the cooling flange 4.

In addition, the circumferential positioning of the flange presser 1 and the base 2 is performed, for example, in such a way that marks such as mark-off lines are preliminarily provided on the circumferential surfaces of the flange presser 1 and the base 2, and while monitoring the marks, the respective corresponding protrusions are made to coincide with each other on the same straight lines. Additionally, the protrusions 6a and 9a and the bolt 5a, the protrusions 6b and 9b and the bolt 5b, and the protrusions 6c and 9c and the bolt 5c are arranged in three respective same radial directions, of the cooling flange 4, which are spaced apart from one another by 120°. Accordingly, in Embodiment 1, the protrusions 6a, 6b, and 6c and the protrusions 9a, 9b, and 9c are arranged at the respective vertexes of equilateral triangles.

The sides with which six protrusions 6a, 6b, 6c, 9a, 9b, and 9c make contact are perpendicular to the direction in which the bolts, which are fastening members, are tightened. The reason for that is that, when the sides are not perpendicular to the direction in which the bolts are tightened, the cooling flange 4 sideslips when being flanked with the flange presser 1 and the base 2. In Embodiment 1, the side, of the cooling flange 4, which faces the flange presser 1 (with which the protrusions 6a, 6b, and 6c make contact) and the side, of the cooling flange 4, which faces the base 2 (with which the protrusions 9a, 9b, and 9c make contact) are perpendicular to the direction in which the bolts are tightened; however, the present invention is not limited thereto, and the sides with which six protrusions 6a, 6b, 6c, 9a, 9b, and 9c make contact may be different six sides, as long as the sides are all perpendicular to the direction in which the bolts are tightened.

The bolt 5 is disposed outside the diameter, i.e., the circumference of the cooling flange 4 so that the bolt 5 and the cooling flange 4 do not make contact with each other. When being tightly screwed, the bolt 5 is slightly deformed. Provided that the cooling flange 4 and the bolt 5 are fixed with each other, the deformation of the bolt 5 causes the cooling flange 4 to be deformed, whereby the mirror 3 is also deformed; however, in the structure according to Embodiment 1, because the bolt 5 and the cooling flange 4 do not make contact with each other, the cooling flange 4 is not deformed, even when the bolt 5 is deformed.

Figure 2:
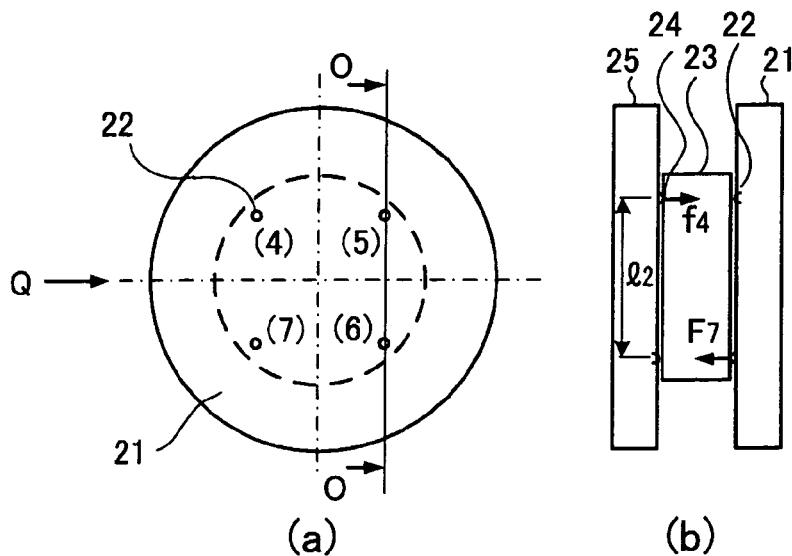
FIG. 2 is a set of diagrams illustrating a contacting state in the case where four each of protrusions are provided.

Next, the reason why the flatness is enhanced when a cooling flange is flanked with two components each having three protrusions and the protrusions face respective corresponding protrusions will be explained. FIG. 2 is a set of diagrams illustrating a contacting state in the case where four each of protrusions (4), (5), (6), and (7) are provided; FIG. 2(a) is an elevation view; FIG. 2(b) is a side view, as viewed in the direction of the arrow Q in FIG. 4(a). For simplicity, a case in which the protrusions are arranged at the vertexes of a square will be discussed. It is conceivable that, due to a machining error, even though four protrusions are provided, all the four protrusions are not necessarily on the same plane, but only three protrusions out of four protrusions make contact with a side. FIG. 2(b) illustrates a case in which a protrusion 22 ((4)) of a flange presser 21 and a protrusion 24 ((7)) of a base 25 make no contact with a cooling flange 23. Each of arrows F and f in figures indicates force exerted from one of the protrusions to the cooling flange 23 when the flange presser 21 and the base 25 are faxed fastened. Because the protrusions are arranged at the vertexes of the square, $f_4$ and $F_7$ have the same magnitude; a twisting moment of $f_4 \times l_2$ is exerted on the cross section O-O in FIG. 2, whereby the cooling flange 23 is deformed.

Figure 3:
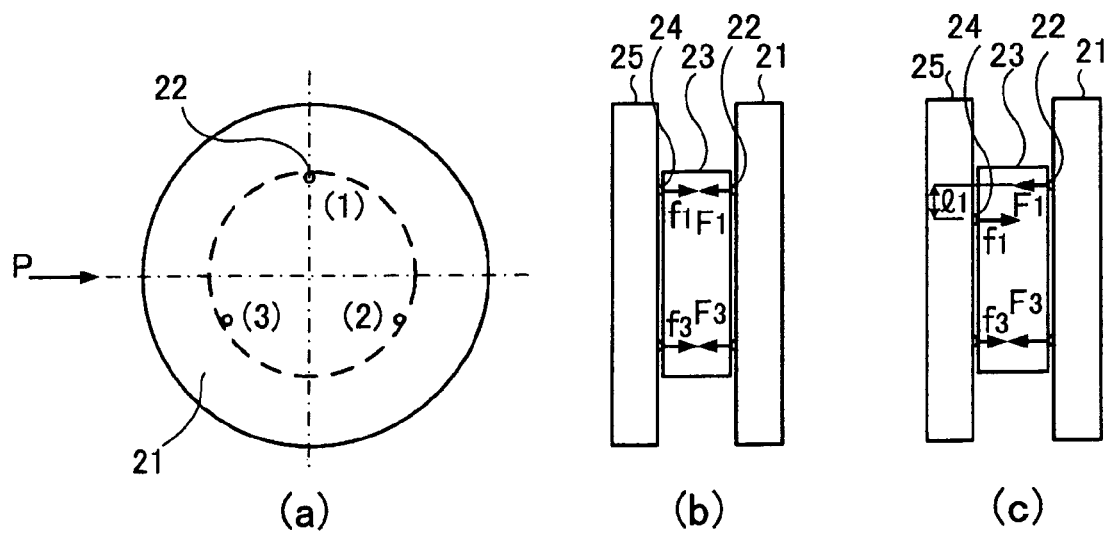
FIG. 3 is a set of diagrams illustrating a contacting state in the case where three each of protrusions are provided.

Next, a case in which three each of the protrusions are provided will be discussed. FIG. 3 is a set of explanatory diagrams illustrating a contacting state in the case where three each of protrusions (1), (2), and (3 are provided; FIG. 3(a) is an elevation view; FIGS. 3(b) and 3(c) are side views, as viewed in the direction of the arrow P. For simplicity, a case in which the protrusions are arranged at the vertexes of an equilateral triangle will be discussed. FIG. 3(b) illustrates a case in which three protrusions 22 of a flange presser 21 and three protrusions 24 of a base 25 are arranged in such a way as to face respective corresponding protrusions. FIG. 3(c) illustrates a case in which the protrusion 22 ((1)) of the flange presser 21 and the protrusion 24((1)) of the base 25a redisplaced by $l_1$ from each other. In the case where, as illustrated in FIG. 3(c), the protrusions are not arranged in such a way as to face respective corresponding protrusions and the protrusion 22((1)) and the protrusion 24((1)) are displaced from each other by $l_1$, which is a relatively short distance, a bending moment of $F_1 \times l_1$ is exerted on the cooling flange 23, whereby the cooling flange 23 is deformed. In this situation, because $l_1$ is a relatively short distance, $F_1$ and $f_1$ are considered to be of approximately the same value.

In contrast, in the case where, as illustrated in FIG. 3(b), the protrusions 22 and 24 are arranged in such a way as to face each other, due to the law of action and reaction, $F_1$ and $f_1$, $F_2$ and $f_2$, and $F_3$ and $f_3$ each have the same magnitude and opposite directions; therefore, all the respective resultant forces of $F_1$ and $f_1$, $F_2$ and $f_2$, and $F_3$ and $f_3$ become zero, whereby no bending moment is exerted on the cooling flange 23. As a result, the cooling flange 23 is not deformed, and the flatness of the mirror that abuts on the cooling flange 23 is maintained in a highly precise state. In addition, it is desirable that the protrusions are arranged at the vertexes of an equilateral triangle; however, the present invention is not limited thereto, and three protrusions may be arranged at the vertexes, of a triangle, which are not on the same straight line.

In the structure according to Embodiment 1, ultrahigh-precision flat-surface machining is applied only to one side of the cooling flange 4 on (with) which the mirror 3 abuts (makes contact), and ordinary machining is applied to other contact surfaces; therefore, the structure is inexpensive. Moreover, because the cooling flange 4 to which ultrahigh-precision flat-surface machining is applied is a small component, the machining can readily be applied to the cooling flange 4, without any restriction on the machining apparatus. Additionally, by making the bolt 5 penetrate the through-hole provided in the flange presser 1, the cooling flange 4 is fixed; however, the cooling flange 4 may be fixed by drilling a through-hole in the base 2, applying machining for a screw hole to the flange presser 1, and inserting the bolt 5 into the through-hole in the base 2. Still moreover, instead of the mirror 3, a lens (optical element) may be utilized; in the case of a bend mirror, the bend block corresponds to the base.

In Embodiment 1, because the cooling flange 4 is flanked with two components each having three protrusions that face the respective corresponding protrusions, no bending moment is exerted on the cooling flange 4, even when the cooling flange 4 is fixed fastened; thus, the flatness of the cooling flange 4 is maintained in a highly precise state. As a result, the flatness of the mirror on which the cooling flange 4 is pressed (abuts) is also maintained in a highly precise state. Moreover, expensive ultrahigh-precision flat-surface machining may be applied only to one side of the cooling flange by which the mirror is pressed; therefore, the laser oscillator is inexpensive. Still moreover, because the component to which ultrahigh-precision flat-surface machining is applied is relatively small, the machining can readily be applied to the component, without any restriction on the machining apparatus.

When, in order to suppress deformation of the mirror, the mirror is fixed in such a way as to be pressed at both sides thereof through a three-point contact structure, the coolability of the mirror is lowered. In Embodiment 1, in order to suppress deformation of the cooling flange, the cooling flange is fixed in such a way as to be pressed at both sides thereof through a three-point contact structure. Accordingly, deformation of the mirror can be suppressed without reducing the contact area between the cooling flange and the mirror, i.e., without deteriorating the coolability of the mirror.

Embodiment 2

Figure 4:
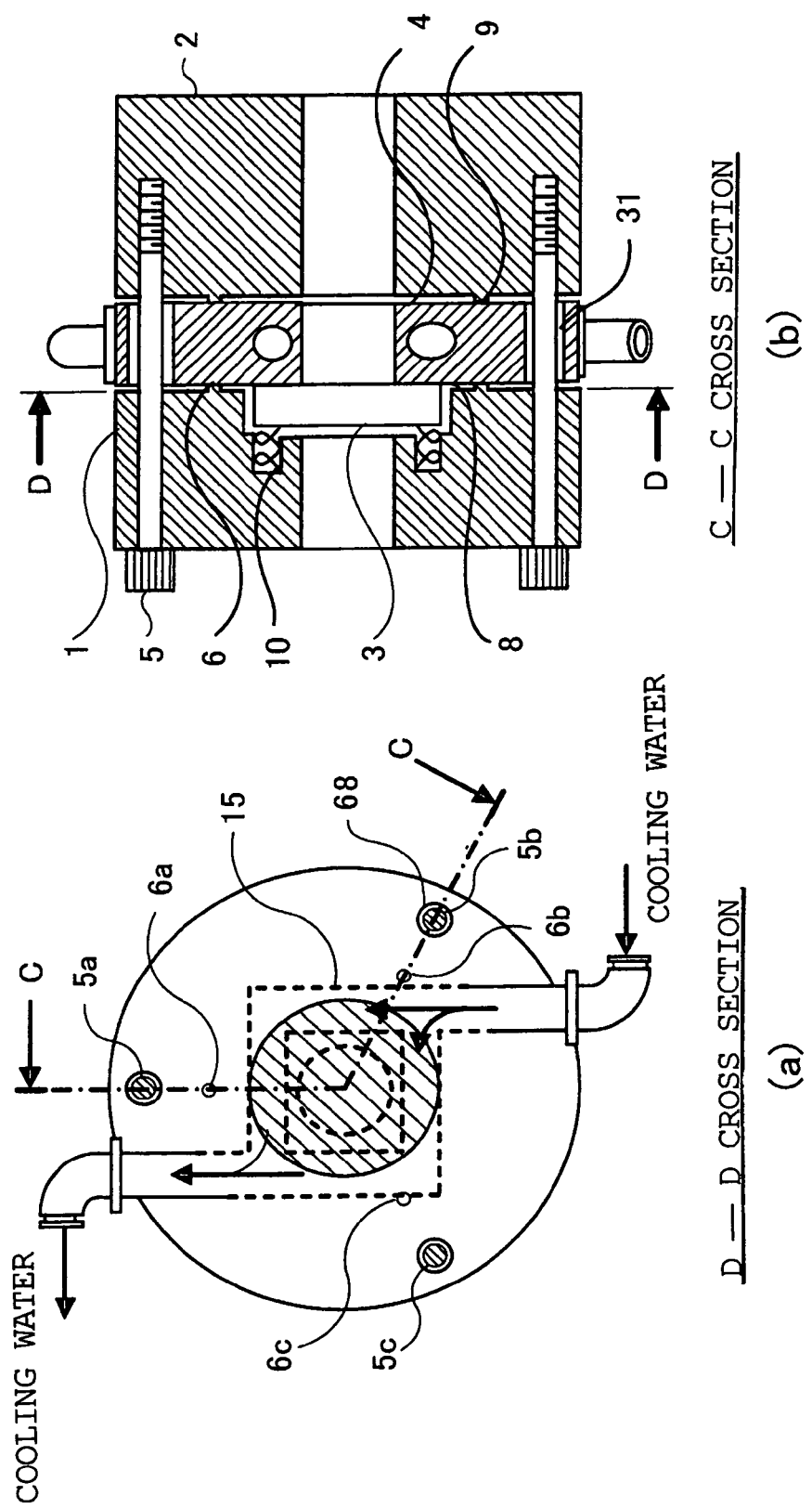
FIG. 4 is a set of cross-sectional views illustrating a mirror-mounting structure, for a laser oscillator, according to Embodiment 2.

FIG. 4 is a set of views illustrating a mirror-mounting structure, for a laser oscillator, according to Embodiment 2; FIG. 4a) is a cross-sectional view of the mirror-mounting structure in FIG. 4(b), as viewed along D-D; FIG. 4b) is a cross-sectional view of the mirror-mounting structure in FIG. 4(a), as viewed along C-C. In addition, the same reference characters in Figures denote the same or equivalent constituent elements. Instead of the O-shaped ring 7 in Embodiment 1, the flange presser 1 presses the mirror 3 against the cooling flange 4 by the intermediary of coil springs 10.

Additionally, in Embodiment 1, the bolt 5 is disposed outside the cooling flange 4; however, in Embodiment 2, a through-hole 31 having a diameter longer than that of the bolt 5 is provided in the cooling flange 4, and the bolt 5 is inserted into the through-hole 31. Because the bolt 5 and the cooling flange 4 do not make contact with each other, the cooling flange 4 is never deformed, even when the bolt 5 is deformed; thus, the flatness of the mirror is maintained in a highly precise state.

Embodiment 3

Figure 5:
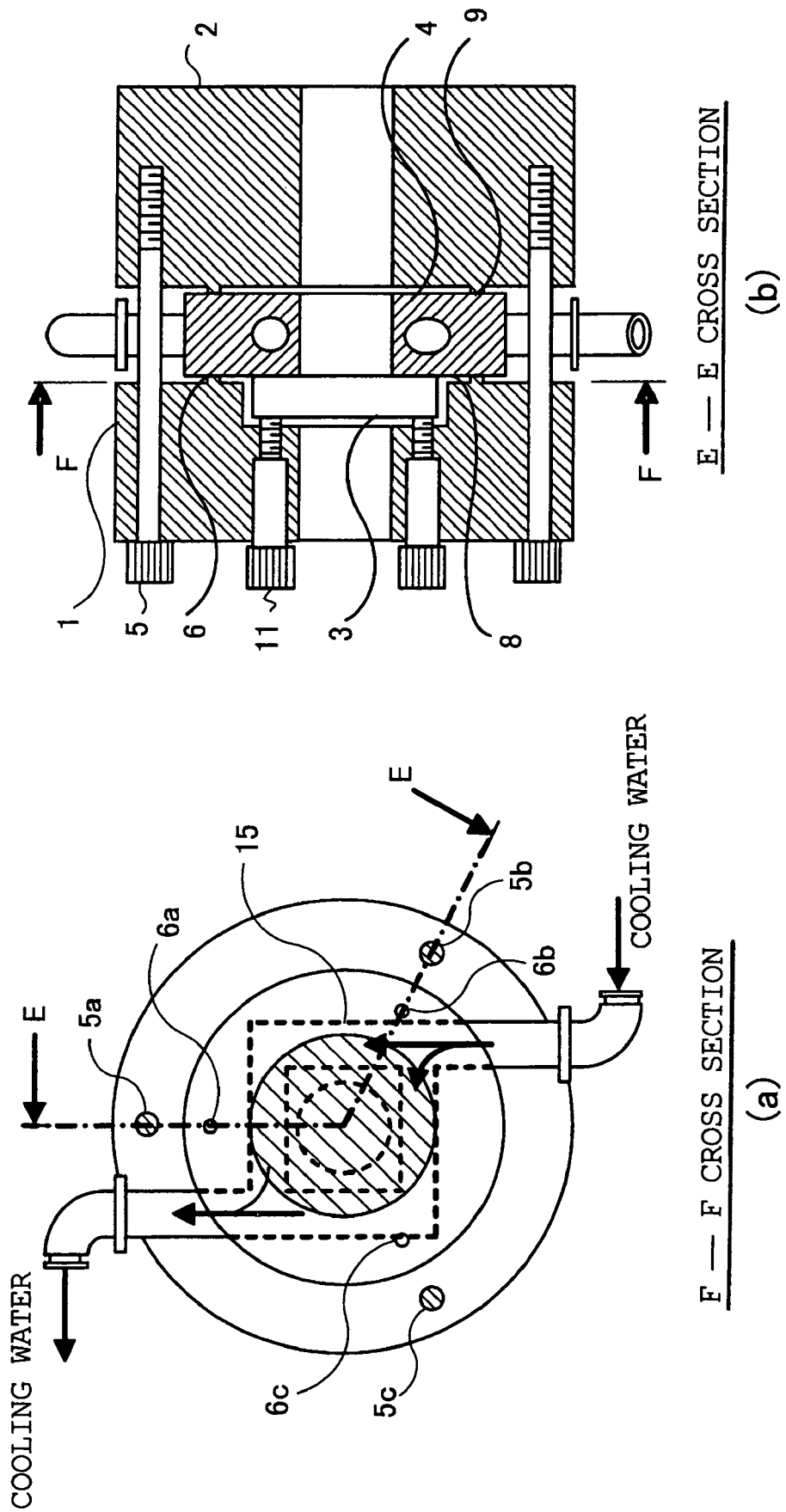
FIG. 5 is a set of cross-sectional views illustrating a mirror-mounting structure, for a laser oscillator, according to Embodiment 3.

FIG. 5 is a set of views illustrating a mirror-mounting structure, for a laser oscillator, according to Embodiment 3; FIG. 5(a) is a cross-sectional view of the mirror-mounting structure in FIG. 5(b), as viewed along F-F; FIG. 5(b) is a cross-sectional view of the mirror-mounting structure in FIG. 5(a), as viewed along E-E. Instead of an elastic member, the mirror 3 is pressed against the cooling flange 4, by use of a bolt 11. A screw hole is preliminarily machined in the flange presser 1, and the bolt 11 is tightened so that the mirror 3 is pressed against the cooling flange 4.

Embodiment 4

Figure 6:
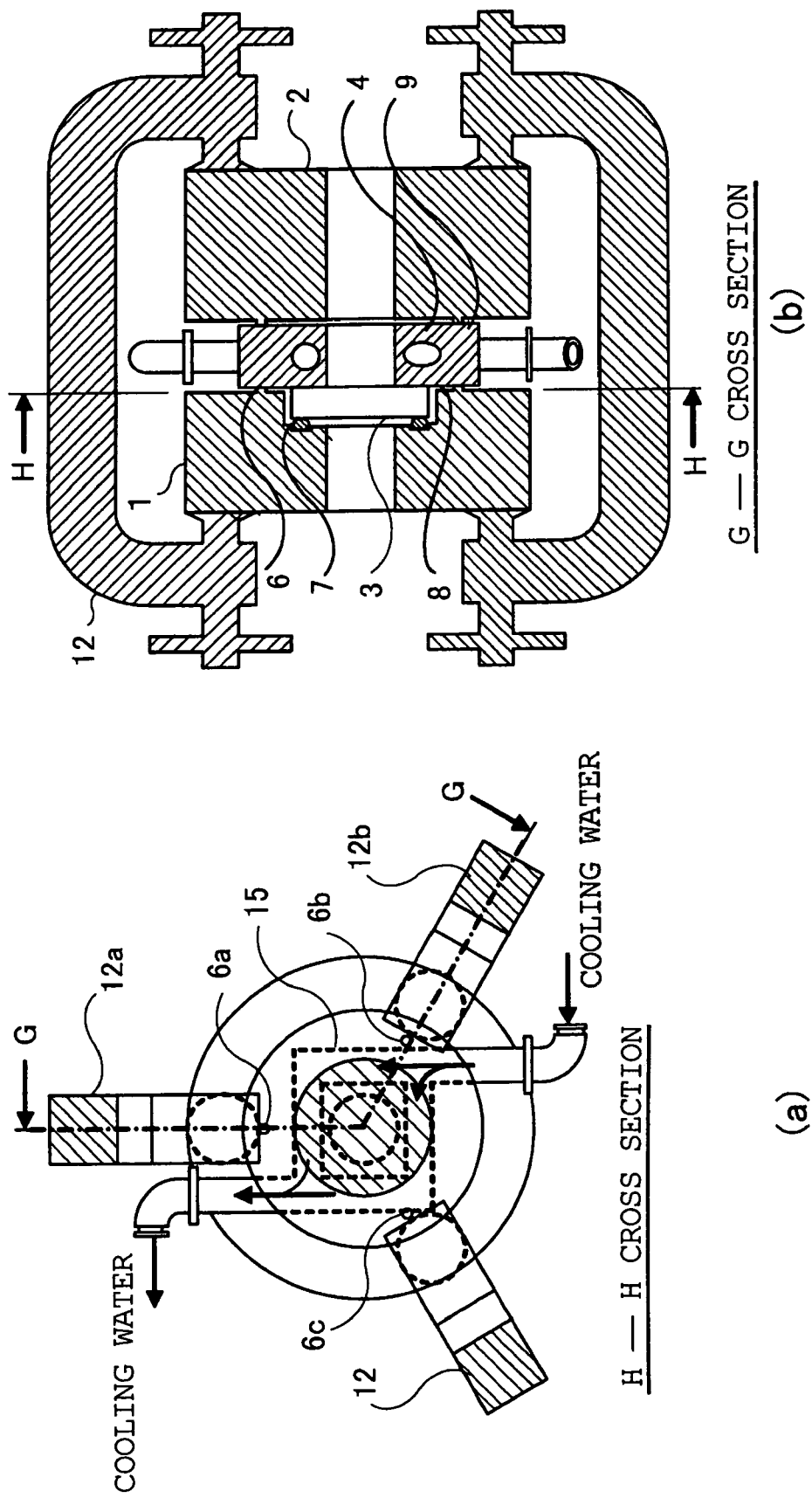
FIG. 6 is a set of cross-sectional views illustrating a mirror-mounting structure, for a laser oscillator, according to Embodiment 4.

FIG. 6 is a set of views illustrating a mirror-mounting structure, for a laser oscillator, according to Embodiment 4; FIG. 6(a) is a cross-sectional view of the mirror-mounting structure in FIG. 6(b), as viewed along H-H; FIG. 6(b) is a cross-sectional view of the mirror-mounting structure in FIG. 6(a), as viewed along G-G. The flange presser 1 and the base 2 are not fastened by use of the bolt 5; instead, a clamper 12 (fastening member) clamps the flange presser 1, the base 2, and the cooling flange 4 together.

Embodiment 5

Figure 7:
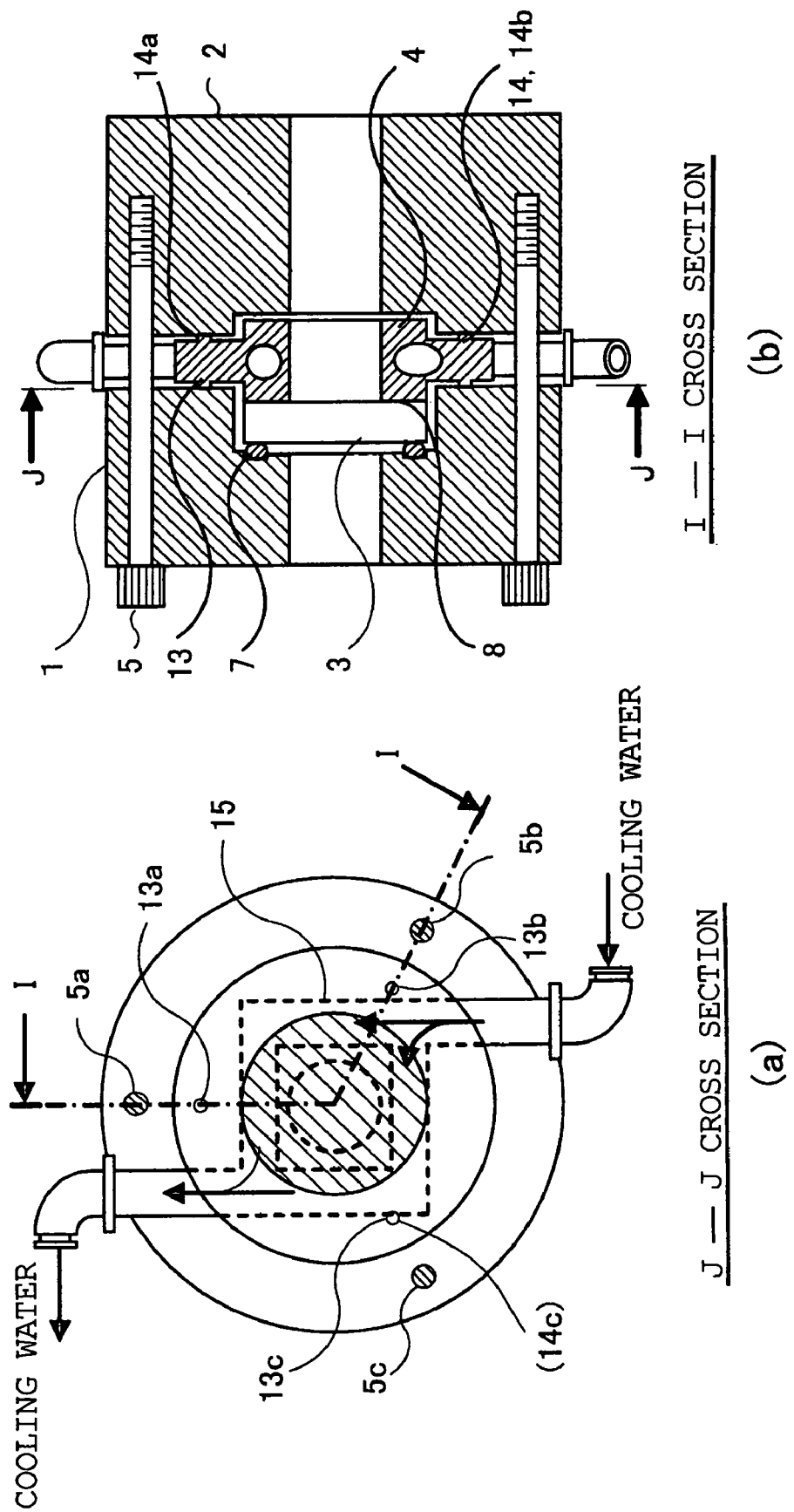
FIG. 7 is a set of cross-sectional views illustrating a mirror-mounting structure, for a laser oscillator, according to Embodiment 5.

FIG. 7 is a set of views illustrating a mirror-mounting structure, for a laser oscillator, according to Embodiment 5; FIG. 7(a) is a cross-sectional view of the mirror-mounting structure in FIG. 7(b), as viewed along J-J; FIG. 7(b) is a cross-sectional view of the mirror-mounting structure in FIG. 7(a), as viewed along I-I. Three protrusions 13 (13a, 13b, and 13c), which are to be situated between the flange presser 1 and the cooling flange 4, are provided in the cooling flange 4. In addition, three protrusions 14 (14a, 14b, and 14c), which are to be situated between the cooling flange 4 and the base 2, are provided in the cooling flange 4. The protrusions 13 and 14 are situated lower than the surface 8 with which the mirror makes contact. The reason for that is that ultrahigh-precision flat-surface machining can be applied only to the highest surface.

Embodiment 6

Figure 8:
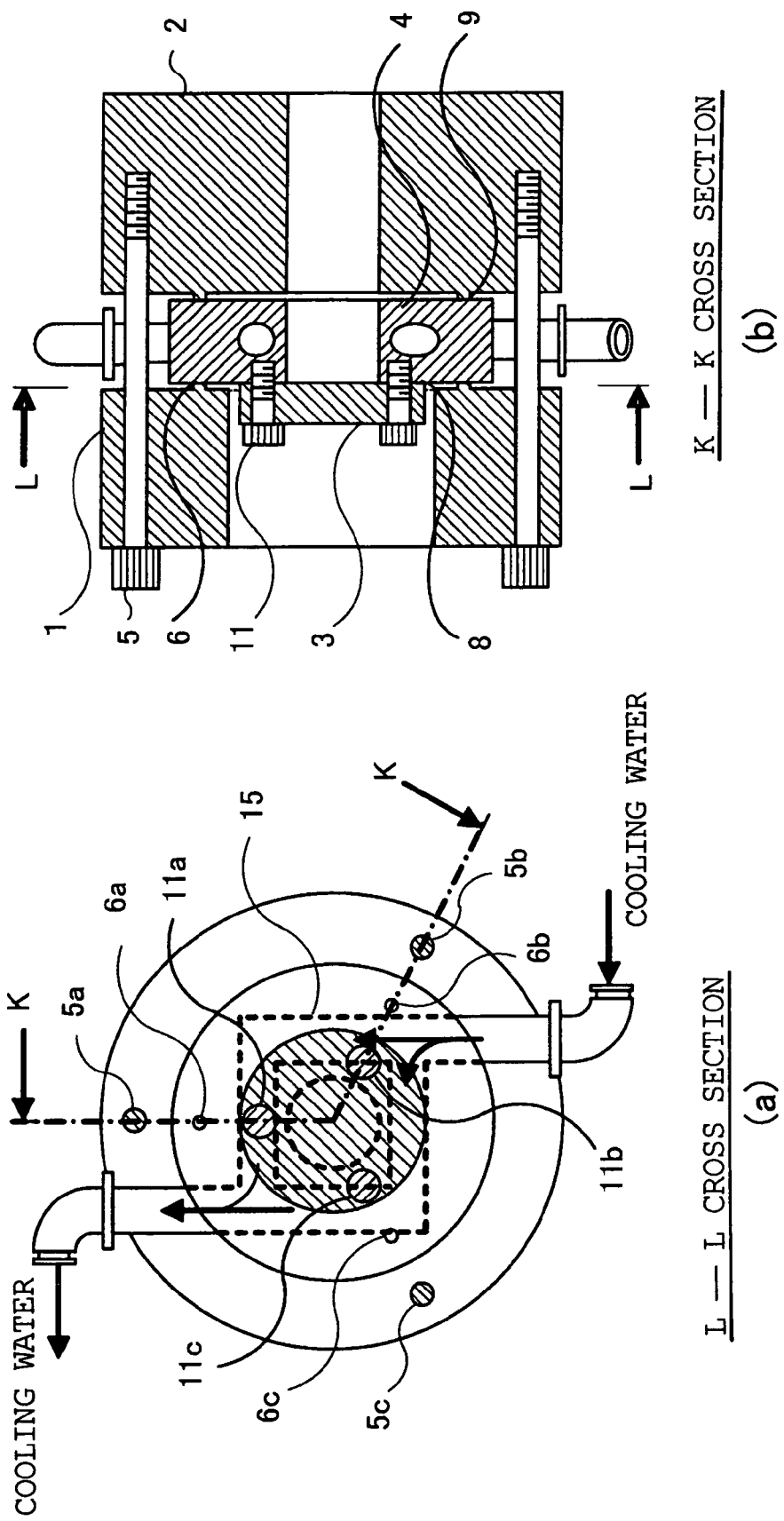
FIG. 8 is a set of cross-sectional views illustrating a mirror-mounting structure, for a laser oscillator, according to Embodiment 6.

FIG. 8 is a set of views illustrating a mirror-mounting structure, for a laser oscillator, according to Embodiment 6; FIG. 8(a) is a cross-sectional view of the mirror-mounting structure in FIG. 8(b), as viewed along L-L; FIG. 8(b) is a cross-sectional view of the mirror-mounting structure in FIG. 8(a), as viewed along K-K. Holes into which bolts 11 (11a, 11b, and 11c) are inserted and screw holes are preliminarily machined in the mirror 3 and in the cooling flange 4, respectively. The bolts 11 (11a, 11b, and 11c) are tightened so that the mirror 3 is pressed against the cooling flange 4. Additionally, the protrusion 6a and the bolts 5a and 11a, the protrusion 6b and the bolts 5b and 11b, and the protrusion 6c and the bolts 5c and 11c are arranged in three respective same radial directions, of the cooling flange 4, which are spaced apart from one another by 120°.

Embodiment 7

Figure 9:
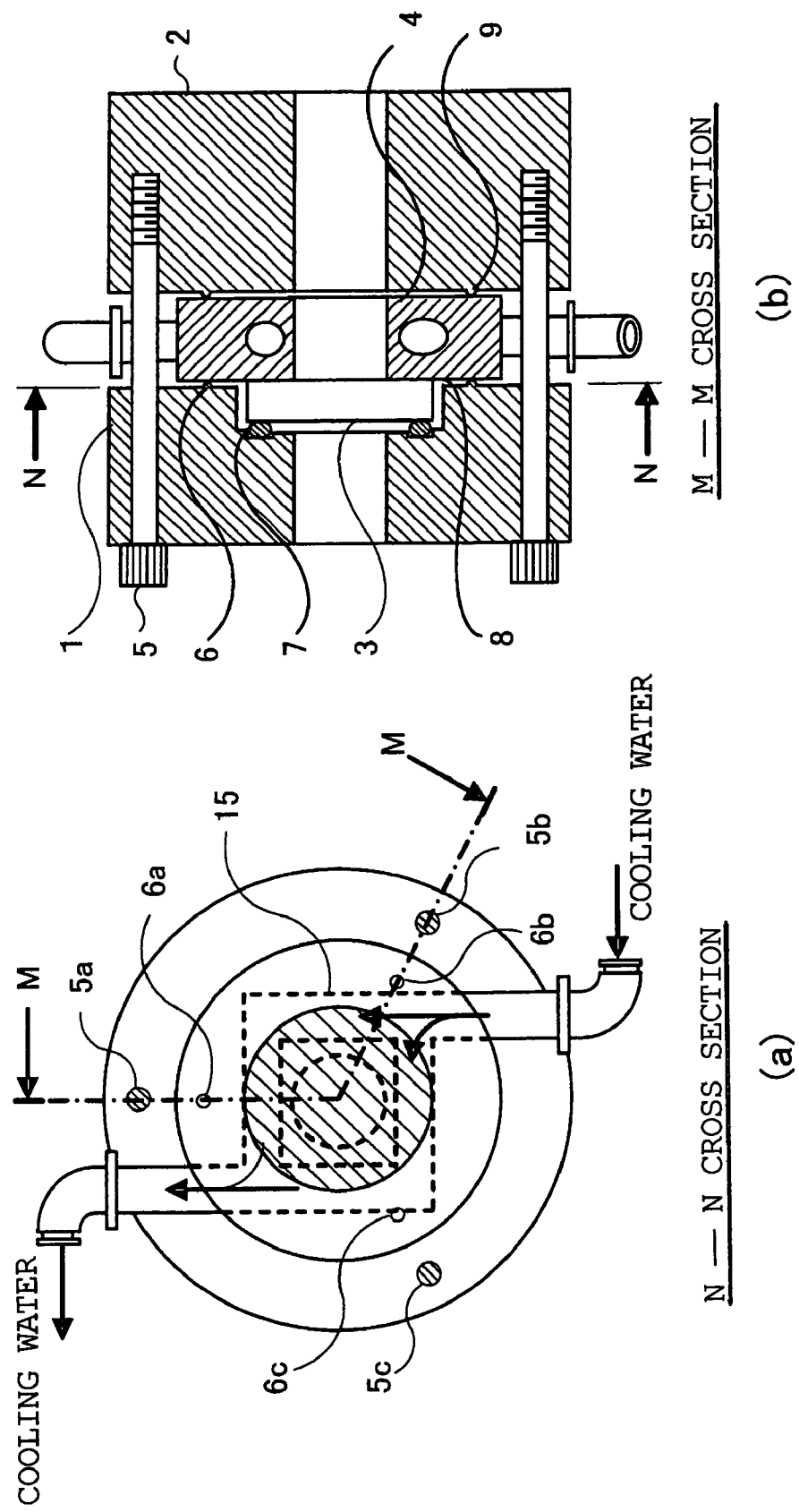
FIG. 9 is a set of cross-sectional views illustrating a mirror-mounting structure, for a laser oscillator, according to Embodiment 7.
Figure 10:
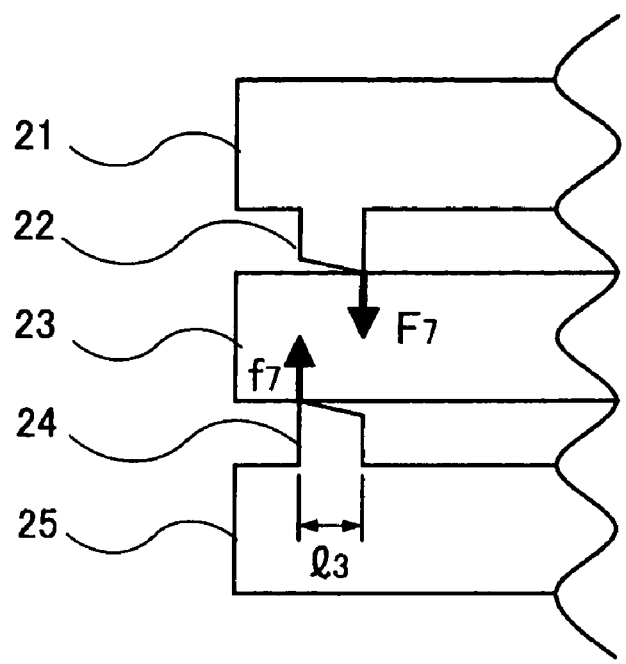
FIG. 10 is an explanatory diagram illustrating the occurrence of a moment exerted on a cooling flange in the case where the distal endfaces of protrusions are planar.
Figure 11:
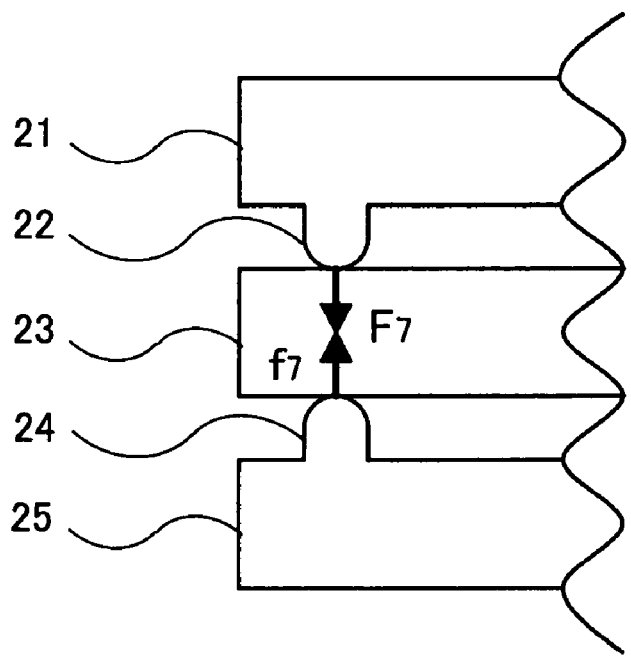
FIG. 11 is an explanatory diagram illustrating that, in the case where the distal endfaces of protrusions are spherical, a moment exerted on a cooling flange is not likely to occur.

FIG. 9 is a set of views illustrating a mirror-mounting structure, for a laser oscillator, according to Embodiment 7; FIG. 9(a) is a cross-sectional view of the mirror-mounting structure in FIG. 9(b), as viewed along N-N; FIG. 9(b) is a cross-sectional view of the mirror-mounting structure in FIG. 9(a), as viewed along M-M. In the laser oscillator in FIG. 9, the distal endface of the protrusion is made spherical. FIGS. 10 and 11 are views for explaining the contacting conditions in the case where the distal endfaces are planar and spherical, respectively. As illustrated in FIG. 10, in the case where the distal endface of the protrusion is planar, due to a machining error, the degrees of being parallel of the distal endfaces of the protrusion 22 of the flange presser 21 and the protrusion 24 of the base 25 and the degree of being parallel of the surface of the cooling flange 23 differ from one another. In this situation, a positional difference $l_3$ up to a distance corresponding to the diameter of the contacting distal endface is caused between $F_7$ and $f_7$; a bending moment of $F_7 \times l_3$ is exerted on the cooling flange. As a result, the cooling flange 23 and the mirror are deformed.

In contrast, as illustrated in FIG. 11, in the case where the distal endface of the protrusion is spherical, the contacting position is constant, whereby no positional difference between $F_7$ and $f_7$ is caused. As a result, because no bending moment is produced, the flatness levels of the cooling flange 23 and the mirror are maintained in a highly precise state. Although the distal endface of the protrusion is spherical, the spherical endface may not be circular spherical. The spherical endface may be oval spherical. In sum, it is only necessary that the front end of the protrusion has a convergent and round spherical shape. As a result, because the contact area between the front end of the protrusion and the surface (the surface of the cooling flange 23) is reduced, a bending moment exerted from the protrusions is prevented from being produced; therefore, the flatness of the mounted optical element (mirror) is maintained in a highly precise state.

Embodiment 8

Figure 12:
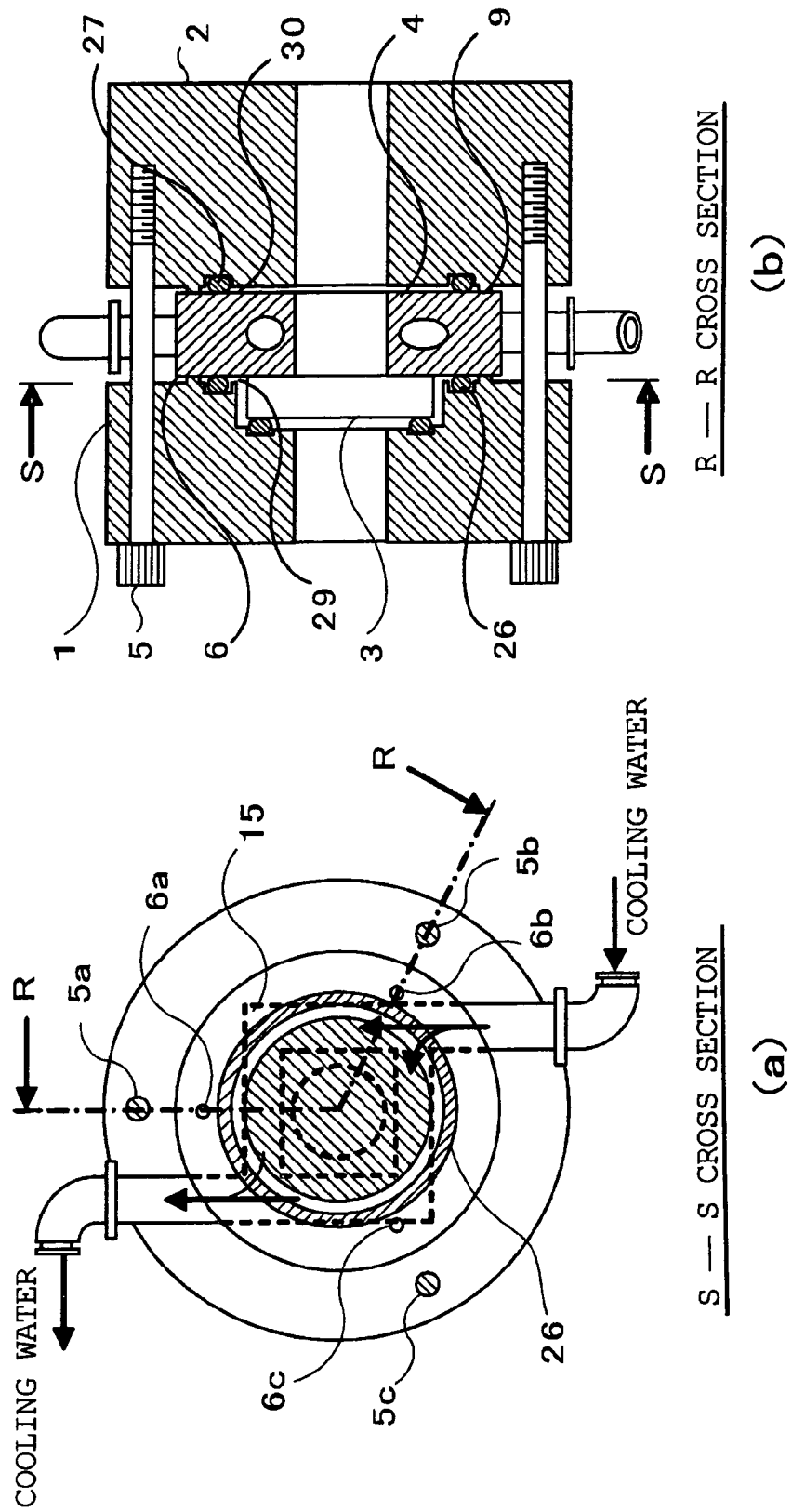
FIG. 12 is a set of cross-sectional views illustrating a mirror-mounting structure, for a laser oscillator, according to Embodiment 8.

FIG. 12 is a set of views illustrating a mirror-mounting structure, for a laser oscillator, according to Embodiment 8; FIG. 12(a) is a cross-sectional view of the mirror-mounting structure in FIG. 12(b), as viewed along S-S; FIG. 12(b) is a cross-sectional view of the mirror-mounting structure in FIG. 12(a), as viewed along R-R. In order to maintain the airtightness of the inside of the laser oscillator, O-shaped rings 26 and 27 are inserted between the flange presser 1 and the cooling flange 4 and between the cooling flange 4 and the base 2, respectively. In this example, a first O-shaped-ring groove for the O-shaped ring 26 is provided in the flange presser 1. A second O-shaped-ring groove for the O-shaped ring 27 is provided in the base 2. However, the O-shaped-ring grooves may be provided in the cooling flange 4. A gap 29 is provided between the surface (surface of the flange presser 1) surrounding the first O-shaped-ring groove for the O-shaped ring 26 and the surface of the cooling flange 4 facing the surface of the flange presser 1 so that the flange presser 1 and the cooling flange 4 make contact with each other only by the intermediary of the protrusions 6. A gap 30 is provided between the surface (surface of the base 2) surrounding the second O-shaped-ring groove for the O-shaped ring 27 and the surface of the cooling flange 4 facing the surface of the base 2 so that the cooling flange 4 and the base 2 make contact with each other only by the intermediary of the protrusions 9.

In the case where the gaps 29 and 30 are not provided, because the cooling flange 4 makes contact with the flange presser 1 and the base 2, whereby the three-point contact is no longer performed, the flange presser 1 and the base 2 profile-deform the cooling flange 4; however, by providing the gaps, the profile deformation is prevented. In addition, it is only necessary that the gaps are larger than the amounts of slight deformations of the flange presser 1 and the base 2; the gaps are made to be approximately several tens of micrometers. Because the foregoing dimensions of the gaps are sufficiently small compared with the diameter of the O-shaped rings, pressure differences do not cause the O-shaped rings to run off the O-shaped-ring grooves.

Next, a warp of the cooling flange 4 due to reaction force produced by the O-shaped rings 26 and 27 will be explained. The reaction force that is produced when the O-shaped rings are crushed is exerted on the whole periphery of the cooling flange 4. This situation corresponds to a state in which an equally distributed load is imposed on a beam both ends of which are fixed with protrusions; it is worried that portions, of the cooling flange 4, other than the portions held by the protrusions are warped, whereby the cooling flange 4 profile-deforms the mirror 3, which is soft. In contrast, in the structure according to Embodiment 8, by enlarging the thickness of the cooling flange 4 so as to enhance the bending rigidity of the cooling flange 4, the warp of the cooling flange 4 due to the reaction force produced by the O-shaped rings is prevented. Because being a component that is inexpensive compared with an optical element, the cooling flange 4 whose thickness is enlarged is still inexpensive.

Embodiment 9

Figure 13:
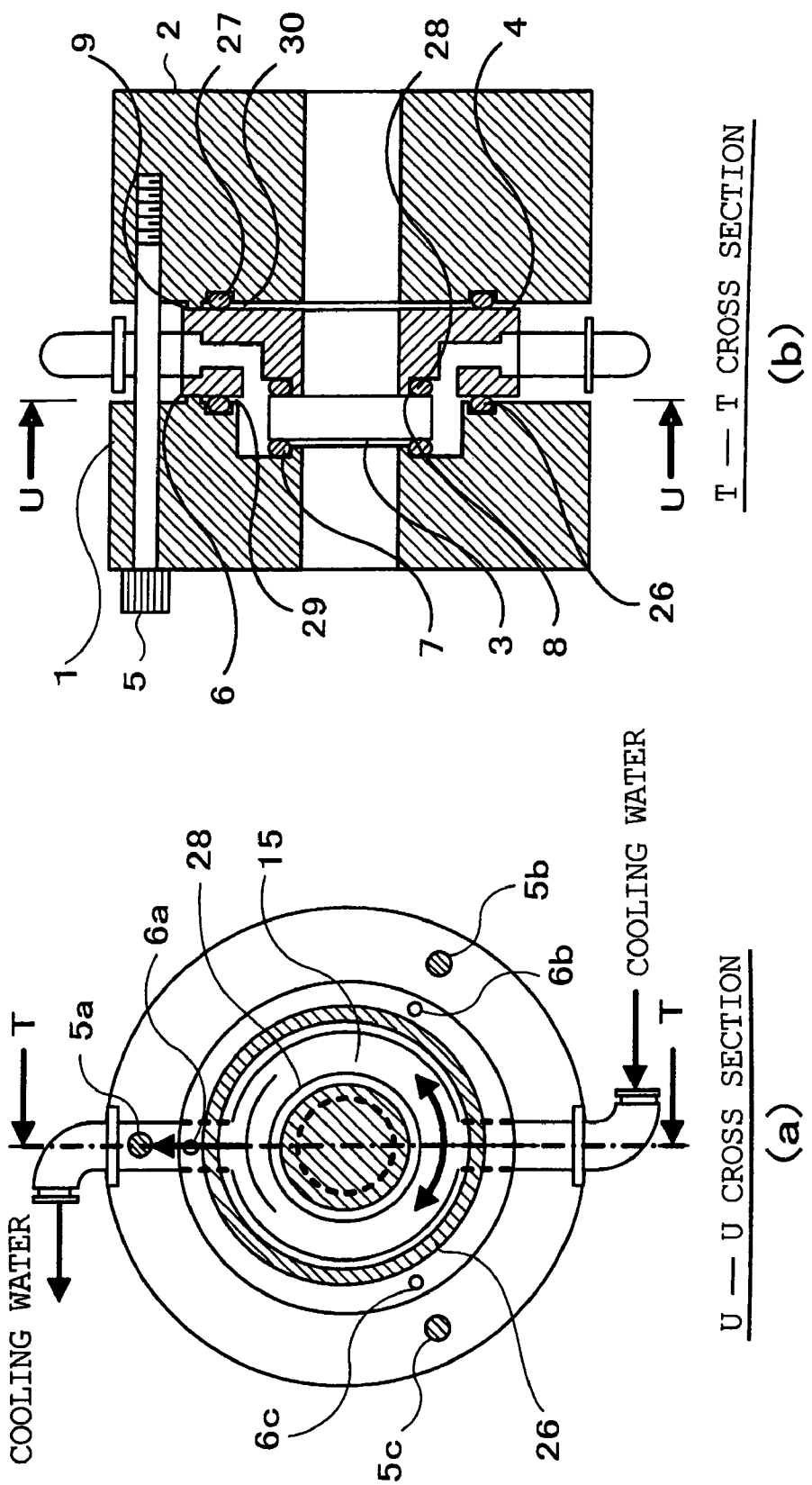
FIG. 13 is a set of cross-sectional views illustrating a mirror-mounting structure, for a laser oscillator, according to Embodiment 9.
Figure 14:
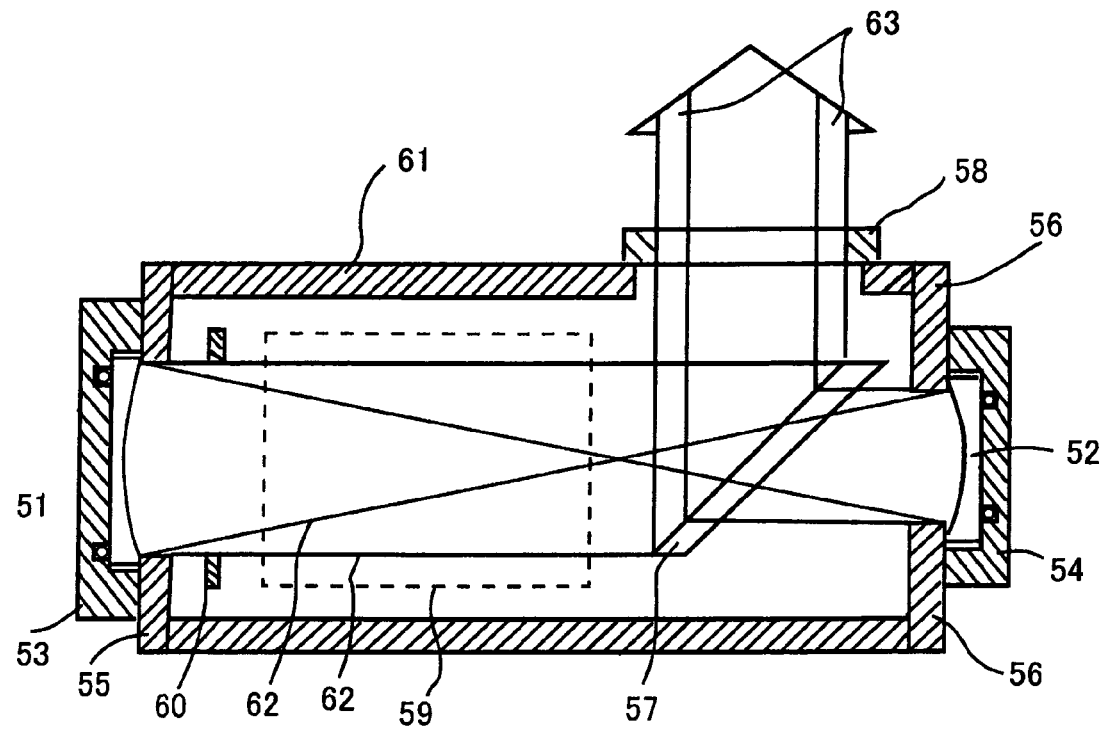
FIG. 14 is a structural cross-sectional view illustrating a laser oscillator utilizing a conventional unstable resonator.
Figure 15:
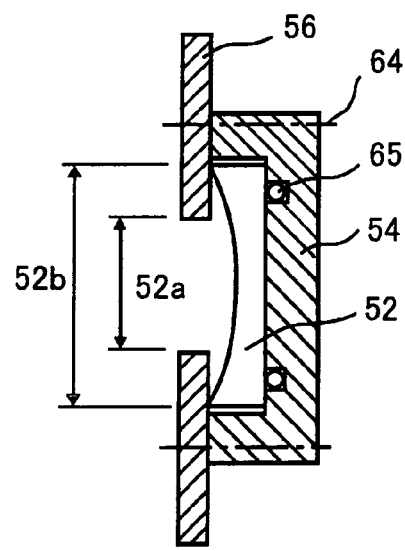
FIG. 15 is a cross-sectional view illustrating a magnifying mirror unit in FIG. 14.
Figure 16:
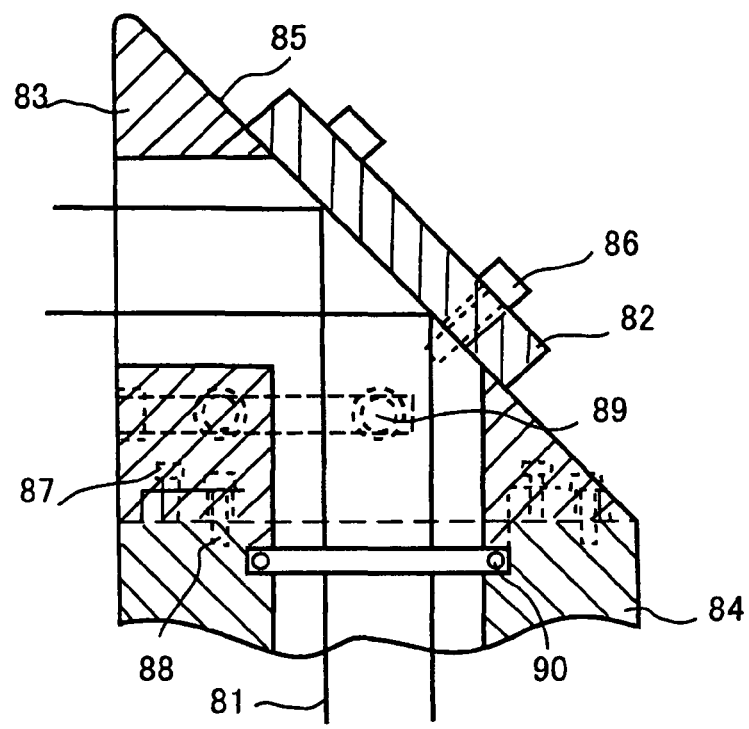
FIG. 16 is a principal-part cross-sectional view illustrating the mounting structure for a conventional mirror.
Figure 17:
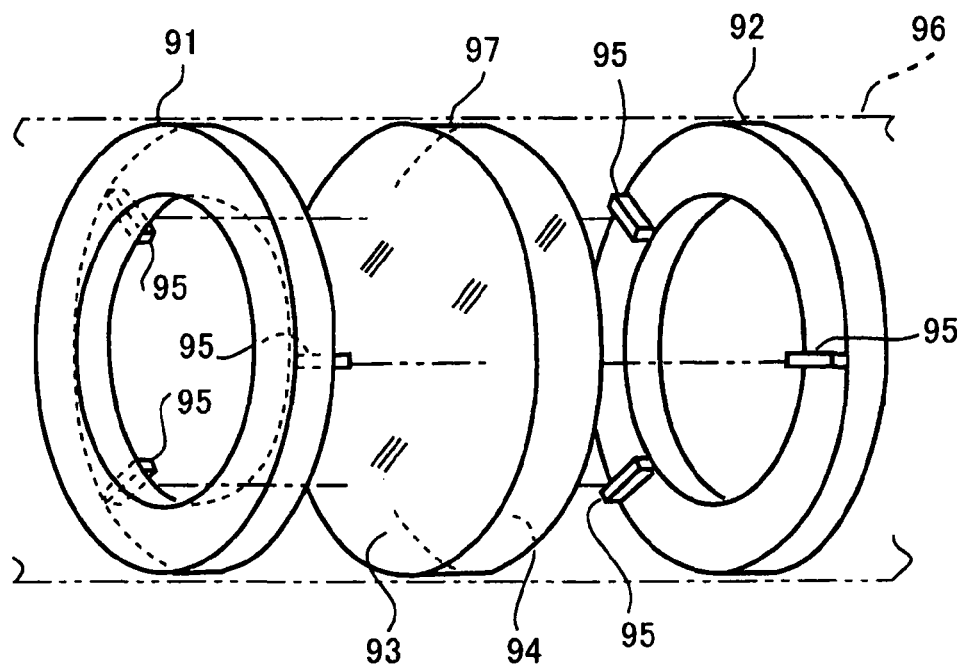
FIG. 17 is an exploded perspective view illustrating a lens-holding structure in an optical device having a conventional exposure apparatus.

FIG. 13 is a set of views illustrating a mirror-mounting structure, for a laser oscillator, according to Embodiment 9; FIG. 13(a) is a cross-sectional view of the mirror-mounting structure in FIG. 13(b), as viewed along U-U; FIG. 13(b) is a cross-sectional view of the mirror-mounting structure in FIG. 13(a), as viewed along T-T. In order to further improve the mirror-mounting structure according to Embodiment 8, by additionally inserting O-shaped rings 28 between the mirror 3 and the cooling flange 4 so as to provide at a side of the mirror 3 a flow path for the cooling water, the side of the mirror 3 is directly cooled with water so that the coolability is raised. With regard to the O-shaped rings 26 situated between the flange presser 1 and the cooling flange 4 and the O-shaped rings 27 situated between the cooling flange 4 and the base 2, the gaps 29 and 30 are provided, as is the case with Embodiment 8, so that a profile deformation is prevented.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A laser oscillator in which an optical element comprising a mirror or a lens abuts on a cooling flange so that the optical element is cooled, and the cooling flange is flanked with a flange presser and a base so that the cooling flange is fixed, wherein opposing sides of the flange presser and the cooling flange make contact with each other by the intermediary of three protrusions provided in either one of the flange presser and the cooling flange, and the three protrusions are arranged at the vertexes of an equilateral triangle; opposing sides of the cooling flange and the base make contact with each other by the intermediary of three protrusions provided in either one of the cooling flange and the base; the three points at which the flange presser and the cooling flange make contact with each other by the intermediary of the protrusions and the three points at which the cooling flange and the base make contact with each other by the intermediary of the protrusions are arranged in such a way as to face respective corresponding points; the flange presser and the base that flank the cooling flange are fixed fastened with a fastening member; and the respective sides with which the six protrusions make contact are situated in such a way as to be perpendicular to the direction of fastening force produced by the fastening member.

2. The laser oscillator according to claim 1, wherein the flange presser presses the optical element against the cooling flange so that the optical element is held.

3. The laser oscillator according to claim 1, wherein an O-shaped ring is provided in a first O-shaped-ring groove disposed in either one of the flange presser and the cooling flange so that the flange presser and the cooling flange are hermetically sealed with the O-shaped ring, and a gap is provided between the surface around the first O-shaped-ring groove and the surface that face the surface around the first O-shaped-ring groove, and wherein an O-shaped ring is provided in a second O-shaped-ring groove disposed in either one of the cooling flange and the base so that the cooling flange and the base are hermetically sealed with the O-shaped ring, and a gap is provided between the surface around the second O-shaped-ring groove and the surface that face the surface around the second O-shaped-ring groove.

4. The laser oscillator according to claim 1, wherein the distal endfaces of the protrusions and are spherical.

5. The laser oscillator according to claim 1, wherein the fastening member is a bolt, and the flange presser and the base that flank the cooling flange are fastened with each other with the bolt disposed outside the circumference of the cooling flange.

6. The laser oscillator according to claim 1, wherein the fastening member is a bolt, and a through-hole whose diameter is larger than that of the bolt is provided in the cooling flange so that the flange presser and the base that flank the cooling flange are fastened with each other with the bolt that penetrates the through-hole.

* * * * *